March 10, 1931. W. L. FLEISHER Re. 17,998
METHOD AND MEANS FOR REDUCING TEMPERATURE BY DEHYDRATION
Original Filed Aug. 8, 1928
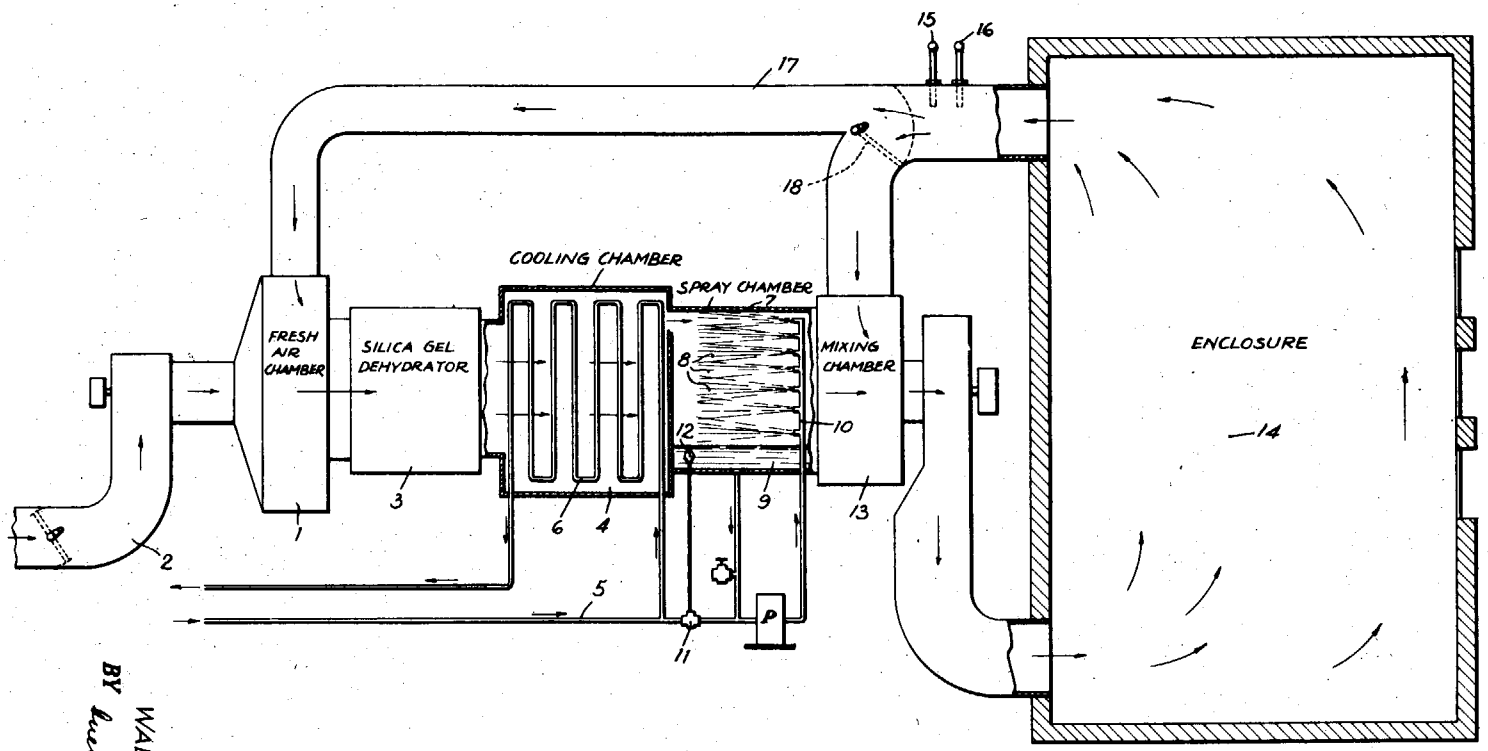
INVENTOR.
WALTER L. FLEISHER,
BY Guell, Dunn & Anderson
ATTORNEYS.

Reissued Mar. 10, 1931 Re. 17,998

UNITED STATES PATENT OFFICE

WALTER L. FLEISHER, OF NEW YORK, N. Y., ASSIGNOR TO THE COOLING & AIR CONDITIONING CORPORATION, OF NEW YORK, N. Y., A CORPORATION OF NEW YORK

METHOD AND MEANS FOR REDUCING TEMPERATURE BY DEHYDRATION

Original No. 1,749,763, dated March 11, 1930, Serial No. 298,213, filed August 8, 1928. Application for reissue filed January 8, 1931. Serial No. 507,511.

This invention relates to methods of and means for the production and control of air and water temperatures and/or air conditions.

The object of the invention is to produce temperature and air condition changes without resort to refrigeration.

The regulation of humidity changes for desired temperatures governs both the degrees of warmth and dryness of a given volume of air or of a treated air area. It is elemental that human comfort, in the different seasons, or under different climatic conditions, depends on the amount of moisture vapor plus the temperature of the affecting air. So also, the same factors determine the establishment of artificial conditions to meet predetermined standards.

In the treatment of air, the problem of converting air having a certain temperature and relative humidity to a condition at a lower temperature, entails the withdrawing of heat from the air or the withdrawal of heat and moisture vapor contents. This has usually been accomplished by refrigeration. The application of refrigeration not only demands initial installation and maintenance, but in many instances, where refrigeration reduces the air to a dew point or condition too low for comfort, the necessity for raising the temperature to a desired dry bulb level requires a heating medium. Under summer conditions, this is a great disadvantage, as well as a considerable expense.

Applicant proposes to eliminate refrigeration and reheating in a system for the reduction of air temperatures.

A feature of the invention resides in the dehydration of air to a desired dew point.

A further feature then comprises bringing the dehydrated air to a dry bulb temperature approximating that or ordinary well water or urban main water. This results in reducing the wet bulb temperature above the dew point but very considerably below the dry bulb temperature. The saturation, then, of the air at said wet bulb temperature will reduce the dry bulb to the same level as the wet bulb temperature. Thus, a reduction in dry bulb temperature is effected without refrigeration, and by controlling the dew point, the resultant desired temperature is obtained without reheating.

Another feature resides in the dehydration of air to a desired dew point whereby water may be reduced in temperature to a predetermined point by contact with the air. Thus, the same process may be applied not only to a method of control of air temperatures but also to a system for the production of desired or controlled water temperatures. For example, the dehydration of air and its temperature fixation by any available means such as urban main water will result in reducing the wet bulb temperature very considerably below the dry bulb temperature as determined by the water. The air at its new wet bulb temperature, if saturated, can thus afford a supply of water at a temperature corresponding to the wet bulb of the air. In effect, the production of cold water by passing water in contact with air at a predetermined depressed wet bulb, is a concomitant of the production of cold air by saturation at a depressed wet bulb temperature.

Further features for controlling the dry bulb and wet bulb temperature, relative humidity and dew point of a body of air without resort to refrigeration, and features for the production and control of low water temperatures will be more apparent from the following detailed description of one form of carrying out the objects of the invention, to be read in connection with the accompanying drawing, in which:—

The figure illustrates a typical system adapted to carry out the objects of the invention by dehydration of air. Considering the drawing, numeral 1 designates a fresh air chamber having an intake 2 leading to the atmosphere. The air from the fresh air chamber is routed to dehydrator 3. The dehydrator is arranged to expose the air from chamber 1 to a large surface of silica-gel which has the property of extracting moisture from the air. Silica-gel is particularly suited for the purpose inasmuch as it can adsorb an amount of moisture equivalent to many times its weight. Furthermore, this substance may be used indefinitely inasmuch as the property remains unimpaired and upon removal of the moisture from the gel, it is ready to be used again.

From the dehydrator, the air proceeds to a cooling chamber 4 where it is contacted with coils or similar suitable apparatus adapted to reduce the dry bulb temperature of the air to that of the coils. As illustrated, water inlet 5 may lead from any suitable source as a well or a city main, and is introduced so that the fresh cooling liquid encounters the already partly cooled air before passing on to encounter the uncooled air. As a result, the coldest air encounters the coldest cooling liquid and the warmest or incoming air encounters the almost spent cooling liquid. This course of the liquid through coils 6 is indicated by the arrows in the drawing. It is apparent that any suitable cooling coils or fin structure may be utilized to effect the desired result.

After leaving the cooling chamber, the air enters the spray chamber 7 where it passes through spray or mist 8 variously produced. Any suitably atomizing means may be employed and it is patent that suitable apparatus may be installed to remove entrained moisture particles after the air has passed through the spray. The bottom of the spray chamber serves as a reservoir 9 and the water is continually recirculated and used over and over again. As indicated, the water after leaving sprays 10 proceeds through the outlet at the bottom of the chamber for reuse. Any suitable recirculating means for supplying the water to the sprays from the reservoir and continuing the recirculation may be employed. The valve 11 is controlled by float 12 and will add to the water in the reservoir and maintain a desired level responsive to the operation of the float.

Upon leaving the spray chamber, the conditioned air enters mixing chamber 13 whence it may proceed to the enclosure 14 to be ventilated. The air from the enclosure may be routed to the fresh air chambers to be reused in the system or it may by-pass the conditioning apparatus and feed directly to the mixing chamber to dilute the conditioned air.

It is evident that after the system has been operating for a period, that the air in the enclosure is often much nearer the desired condition than the outer air and that less dehydration will be required in bringing it back to standard, and that only a small quantity of the air recirculated need be reconditioned to meet a predetermined standard. Dry bulb thermostat 15 may therefore be provided in the return duct 17 to control damper 18 in the by-pass duct and hence the proportions of the return air by-passed or reconditioned. So also the wet bulb thermostat 16 may be adapted, if desired, to control the volume of the water to the cooling chamber as well as its temperature.

In operation of the system, the air from chamber 1 will be dehydrated by the silica-gel in dehydrator 3 so that any desired dew point may be obtained. The action of the silica-gel in withdrawing moisture produces a rise in temperature of the gel and of the air inasmuch as the latent heat of the withdrawn moisture is given out as sensible heat. The air leaving the dehydrator therefore has a very low dew point but a higher dry bulb temperature than originally. However, after proceeding through the cooling chamber the dry bulb temperature of the air will be considerably reduced by the coils 6 so that the dry bulb temperature will approximate that of the coils and the wet bulb temperature be reduced considerably below the dry bulb level. The dew point, of course, remains the same.

Upon entering the spray chamber, the air will have a very low dew point and a predetermined and low wet bulb temperature. Upon contacting with the spray, the air will saturate at the wet bulb temperature whereupon the dry and wet bulb temperatures will become identical. The dry bulb temperature is therefore effectively pulled down to the wet bulb level due to the preceding dehydration and cooling steps. The water in the spray chamber remains at substantially the same temperature which is the wet bulb temperature of the air; the change due to additional feed to maintain the reservoir level being negligible. Since the water assumes a temperature corresponding to the wet bulb temperature of the air, it will be brought down to this level. In practice, ordinary well water or urban main water may be used for the sprays and by contact with the air at its low wet bulb temperature will be effectively cooled. Thus the system may be used for producing cold water in quantity due to the dehydration of the air which causes it to assume a low wet bulb temperature at any desired level depending upon the degree of dehydration and the cooling effect upon it during its course through the cooling chamber. It should be understood that the cooling chamber may be served by well water or any other source adapted to bring down the dry bulb level of the air at the conclusion of the dehydration step.

From the spray chamber, the air at the desired dry and wet bulb temperatures which at that point are the same, is discharged to the enclosure. A fan or any other suitable means may be used if desired to circulate the air from the mixing chamber to the enclosure and from the enclosure back into the system.

It is evident that various arrangements may be improvised for dehydrating air and reducing the wet bulb temperature. Applicant considers within the purview of this invention any system wherein the dew point of air is reduced to a predetermined point by dehydration and a wet bulb temperature then established by cooling, whereupon the saturation of the air at said wet bulb temperature produces a desired dry bulb condition; the saturation step producing cold water at a point determined by the wet bulb temperature of the air.

Obviously, numerous changes in construction and rearrangements of the parts might be resorted to without departing from the spirit of the invention as defined by the claims.

Having described my invention, what I claim as new and desire to secure by Letters Patent, is:

1. A method of reducing the temperature of air consisting in dehydrating the air and injecting an appreciable amount of moisture into such air.

2. A method of changing the temperature of air consisting in dehydrating it, changing its dry bulb temperature, and injecting an appreciable amount of moisture into such air.

3. A method of controlling the temperature of air consisting in changing its dew point, changing its relative humidity, and injecting an appreciable amount of moisture into such air.

4. A method of temperature regulation consisting in lowering the dew point of a volume of air, lowering its dry bulb temperature, and injecting an appreciable amount of moisture into such air.

5. A method of reducing the temperature of air without refrigeration consisting in dehydrating the air, changing its wet bulb temperature, and injecting an appreciable amount of moisture into said air and at the wet bulb temperature thereof.

6. A method of temperature control consisting in changing the relative humidity of a volume of air and reducing the dry bulb temperature to the level of the wet bulb temperature.

7. A method of cooling air consisting in dehydrating a volume of air, reducing its dry bulb temperature to obtain a desired wet bulb temperature, and adding an appreciable amount of moisture to the air at the wet bulb temperature.

8. Means for conditioning an enclosure comprising a dehydrator for removing moisture vapor from a body of air, cooling means for reducing the dry bulb temperature, and means for adding an appreciable amount of moisture to the air.

9. In a system of the character described, a means for reducing the dew point of air, means for regulating the dry bulb temperature thereof, and means for then changing the relative humidity.

10. In a combination of apparatus for cooling air, a silica gel dehydrator, first means for cooling air from the dehydrator, and means for changing the dry bulb temperature of the air from said first means by adding moisture to it.

11. A system for regulating the temperature of a body of air comprising a dehydrator for reducing the dew point of air passing therethrough, a cooling chamber for reducing the dry bulb temperature of the air from the dehydrator, and a means for adding an appreciable amount of moisture to the air coming from the cooling chamber and up to the wet bulb temperature and at its wet bulb temperature.

12. In a system of the character described, means for reducing the dew point of air, means for changing the wet bulb temperature of the air at its new dew point, and means for delivering said air to an enclosure at said wet bulb temperature.

13. A system of ventilating an enclosure comprising a dehydrator for reducing moisture vapor content of air, cooling means for reducing the dry bulb temperature of the air, means for delivering said air at its wet bulb temperature, and means for diluting said air with other air prior to discharge within an enclosure to be ventilated.

14. In a system of the character described a silica gel dehydrator, a cooling chamber for changing the dry bulb temperature of the air from the dehydrator, the change in said dry bulb temperature producing a predetermined wet bulb temperature, a spray chamber for adding an appreciable amount of moisture to the air at its wet bulb temperature, means for recirculating the water in the spray chamber, means for delivering the air from the spray chamber to an enclosure to be ventilated, and means for recirculating the air from the enclosure to the dehydrator if desired.

15. In a system of the character described, a fresh air intake, means for reducing the dew point of fresh air within the system, said dew point being predetermined, a cooling means maintained at a desired temperature to reduce the wet bulb temperature of said air to a substantially fixed level, means for saturating the air at said wet bulb temperature, means for delivering the air to an enclosure to be ventilated, and means for diluting said air with air from the enclosure prior to its delivery.

16. A method of reducing the temperature of water consisting in dehydrating a volume of air, cooling it and adding an appreciable amount of water to the air at its new wet bulb temperature.

17. A method of controlling the temperature of water consisting in changing the dew point of a volume of air, changing the relative humidity of said volume of air and then passing the air through a water spray.

18. A method of controlling water temperatures by the dehydration of air consisting in changing the wet bulb temperature of a volume of air, reducing the dry bulb temperature of said air and then passing the water through said air.

19. A method of water temperature control consisting in reducing the absolute humidity of a volume of air, then adjusting its relative humidity and then passing a volume of water in the form of a spray through the air.

20. In a system of the character described, means for cooling water comprising means for reducing the absolute humidity of a volume of air, means for reducing its wet bulb temperature and means for passing said air through water spray.

21. A method of controlling the condition of air which includes withdrawing air from an enclosure, dehydrating the withdrawn air, cooling the dehydrated air, adding an appreciable amount of moisture to the cooled air, introducing the conditioned air into the enclosure and between the steps of the dehydration and introduction adding an amount of withdrawn air to the conditioned air.

22. A method of controlling the condition of air which included withdrawing air from an enclosure, mixing it with fresh air, dehydrating the resultant mixture, cooling the dehydrated air, adding an appreciable amount of moisture to the cooled air, introducing the conditioned air into the enclosure and between the steps of the dehydration and introduction adding an amount of withdrawn air to the conditioned air.

23. A method of controlling the condition of air which includes withdrawing air from an enclosure, dehydrating the withdrawn air, cooling the dehydrated air, adding an appreciable amount of moisture to the cooled air, and introducing the conditioned air into the enclosure.

24. An apparatus for controlling the condition of air within an enclosure provided with inlet and outlet openings, said apparatus including means providing a passage extending from the outlet opening of said enclosure, a conditioning unit connected to said passage to receive air withdrawn from said enclosure, said unit comprising means for dehydrating, means for cooling and means for spraying water into the air, said apparatus including a further passage connected to said first named passage and to said unit for introducing return air into the conditioned air, means providing a further passage for conducting the resultant air mixture to the inlet opening of said enclosure and means for circulating air through said passages and unit.

25. An apparatus for controlling the condition of air within an enclosure provided with inlet and outlet openings, said apparatus including means providing a passage extending from the outlet openings of said enclosure, a conditioning unit connected to said passage to receive air withdrawn from said enclosure, said unit comprising means for dehydrating, means for cooling and means for spraying water into the air, said apparatus including a further passage connected to said first named passage and to said unit for introducing return air into the conditioned air, means providing a further passage for conducting the resultant air mixture to the inlet opening of said enclosure, means for circulating air through said passages and unit, and means for introducing into said unit fresh unconditioned air.

In testimony whereof I affix my signature.

WALTER L. FLEISHER.